United States Patent
Kudou et al.

(10) Patent No.: US 9,985,751 B2
(45) Date of Patent: May 29, 2018

(54) NODE DEVICE USED IN DISRUPTION/DELAY/DISCONNECT TOLERANT NETWORK AND COMMUNICATION METHOD

(71) Applicant: NEC Corporation, Tokyo (JP)

(72) Inventors: Masato Kudou, Tokyo (JP); Hisashi Mizumoto, Tokyo (JP)

(73) Assignee: NEC CORPORATION, Toyko (JP)

( * ) Notice: Subject to any disclaimer, the term of this patent is extended or adjusted under 35 U.S.C. 154(b) by 21 days.

(21) Appl. No.: 15/109,482

(22) PCT Filed: Jan. 27, 2015

(86) PCT No.: PCT/JP2015/000349
§ 371 (c)(1),
(2) Date: Jul. 1, 2016

(87) PCT Pub. No.: WO2015/133055
PCT Pub. Date: Sep. 11, 2015

(65) Prior Publication Data
US 2016/0329991 A1    Nov. 10, 2016

(30) Foreign Application Priority Data
Mar. 4, 2014    (JP) ................................. 2014-041474

(51) Int. Cl.
*H04L 1/16*    (2006.01)
*H04L 1/18*    (2006.01)
(Continued)

(52) U.S. Cl.
CPC .......... *H04L 1/1628* (2013.01); *H04L 1/1671* (2013.01); *H04L 1/1678* (2013.01);
(Continued)

(58) Field of Classification Search
CPC ... H04L 1/1628; H04L 1/1671; H04L 1/1678; H04L 1/1829; H04L 49/9015; H04W 84/18
See application file for complete search history.

(56) References Cited

U.S. PATENT DOCUMENTS 5,331,673 A * 7/1994 Elko ........................ G06F 11/22
                                                   711/E12.025
7,269,147 B2    9/2007   Kim et al.
(Continued)

FOREIGN PATENT DOCUMENTS

CN        101414965 A * 4/2009
KR   10-2005-0035925     4/2005
(Continued)

OTHER PUBLICATIONS

International Search Report, PCT/JP2015/000349, dated Mar. 17, 2015.
(Continued)

*Primary Examiner* — Dung B Huynh
(74) *Attorney, Agent, or Firm* — Young & Thompson

(57) ABSTRACT

A node device (1A) receives a second ACK list in communication with an adjacent node (1B) and updates a first ACK list and a first summary vector on the basis of the second ACK list. The first summary vector, which indicates messages stored in a message buffer of the node device (1A), is transmitted to the adjacent node (1B) prior to transmission of the messages in the communication with the adjacent node (1B). The first ACK list indicates ACK messages recognized by the node device (1A). The second ACK list indicates ACK messages recognized by the adjacent node (1B). Each ACK message represents a message of arrival at an ultimate destination node via a DTN (100). In this way, for example, a copy having the same content as a message
(Continued)

having arrived at an ultimate destination node can be prevented from being scattered in the Disruption Tolerant Network (DTN).

31 Claims, 9 Drawing Sheets

(51) Int. Cl.
    *H04L 12/883*     (2013.01)
    *H04W 84/18*     (2009.01)

(52) U.S. Cl.
    CPC ........ *H04L 1/1829* (2013.01); *H04L 49/9015* (2013.01); *H04W 84/18* (2013.01)

(56) References Cited

U.S. PATENT DOCUMENTS

| | | | |
|---|---|---|---|
| 8,352,558 B2* | 1/2013 | Boctor | H04L 51/30 709/203 |
| 9,654,199 B2* | 5/2017 | Okuda | H04B 7/15528 |
| 2003/0105877 A1* | 6/2003 | Yagiu | H04L 1/16 709/237 |
| 2004/0054803 A1* | 3/2004 | Ying | H04L 29/06 709/238 |
| 2005/0078678 A1 | 4/2005 | Kim et al. | |
| 2007/0086422 A1* | 4/2007 | Kim | H04L 1/1812 370/349 |
| 2008/0165692 A1 | 7/2008 | Strutt et al. | |
| 2009/0129316 A1* | 5/2009 | Ramanathan | H04L 45/123 370/328 |
| 2011/0211535 A1* | 9/2011 | Fujita | H04L 45/18 370/328 |
| 2012/0246275 A1* | 9/2012 | Ueda | H04W 28/06 709/217 |
| 2012/0257509 A1* | 10/2012 | Natarajan | H04B 7/15521 370/241 |
| 2014/0293891 A1* | 10/2014 | Okuda | H04B 7/15528 370/329 |
| 2014/0328338 A1 | 11/2014 | Ueda et al. | |
| 2014/0341227 A1* | 11/2014 | Redi | H04L 45/70 370/410 |
| 2015/0236867 A1* | 8/2015 | Fujita | H04L 12/1863 370/312 |
| 2015/0296529 A1* | 10/2015 | Fujita | H04L 67/1097 455/450 |
| 2015/0305074 A1* | 10/2015 | Fujita | H04W 92/18 370/338 |
| 2016/0006802 A1* | 1/2016 | Kannhavong | H04L 67/16 709/202 |
| 2016/0192181 A1* | 6/2016 | Choi | H04B 7/26 455/422.1 |
| 2017/0208503 A1* | 7/2017 | Ono | H04W 28/14 |

FOREIGN PATENT DOCUMENTS

| | | |
|---|---|---|
| WO | WO 2011/071045 | 6/2011 |
| WO | WO 2013/076912 | 5/2013 |

OTHER PUBLICATIONS

Korean Official Action—2016-7018480—dated May 16, 2017.
Extended European Search Report—15759187.6—dated Oct. 6, 2017.
Mundur P et al: "Epidemic routing with immunity in Delay Tolerant Networks", Military Communications Conference, 2008. MILCOM 2008. IEEE, IEEE, Piscataway, NJ, USA, Nov. 16, 2008 (Nov. 16, 2008), pp. 1-7, XP031408128, ISBN: 978-1-4244-2676-8 *section I * section IV*.
Tower J P et al: "A Proposed Scheme for Epidemic Routing with Active Curing for Opportunistic Networks", 22nd International Conference on Advanced Information Networking and Applications—Workshops 2008: AINA 2008, IEEE, Piscataway, NJ, USA, Mar. 25, 2008 (Mar. 25, 2008), pp. 1696-1701, XP031241061, ISBN: 978-0-7695-3096-3 *section 1*-section 3.2*.
Zhigang Jin et al: "Adaptive Priority Routing with Ack_Mechanism for DTN networks", Wireless Communications & Signal Processing, 2009. WCSP 2009. International Conference on, IEEE, Piscataway, NJ, USA, Nov. 13, 2009 (Nov. 13, 2009), pp. 1-5, XP031594879, ISBN: 978-1-4244-4856-2 *abstract* *section I* section III.A*.

* cited by examiner

NODE DEVICE USED IN DISRUPTION/DELAY/DISCONNECT TOLERANT NETWORK AND COMMUNICATION METHOD

TECHNICAL FIELD

The present invention relates to a communication node used in a Disruption/Delay/Disconnect Tolerant Network and its communication method.

BACKGROUND ART

A Disruption Tolerant Network is a wireless multi-hop network including a plurality of communication nodes. The Disruption Tolerant Network can be regarded as a Delay Tolerant Network and as a Disconnect Tolerant Network. Disruption/Delay/Disconnect Tolerant Networks are herein referred to collectively as "DTN". In a DTN, a number of communication nodes (hereinafter referred to as "DTN nodes") autonomously relay a message (data bundle or data packet), thereby achieving the delivery of the message from a source node to a destination node. One or both of the source node and the destination node may belong to the DTN (i.e., DTN nodes) or belong to an external network (e.g., the Internet, a public cellular network, or a wireless Local Area Network (LAN)). If one or both of the source node and the destination node belong to an external network, any one of the DTN nodes serves as a router or a gateway that relays messages between the DTN and the external network.

The DTN is based on the premise that a temporary or intermittent communication disconnection could occur due to movement of DTN nodes, blocking of wireless signals caused by an obstacle, or the like. In other words, the DTN is based on the premise that at least at some point in time, there is no stable communication path between the source node and the destination node. To cope with the temporary or intermittent communication disconnection, each DTN node performs a store-and-forward operation. Accordingly, the DTN can also be regarded as a store-and-forward type wireless multi-hop network. Further, some or all of the plurality of DTN nodes constituting the DTN may be mobile terminals having mobility. In this regard, the DTN can also be regarded as a store-and-forward type wireless ad-hoc network. For example, it has been assumed that the DTN is used for emergency communications at the time of a disaster, and inter-vehicle communications and road-to-vehicle communications in Intelligent Transport Systems (ITS).

As described above, a DTN node performs a store-and-forward operation. That is, a DTN node temporarily stores messages, received from a certain DTN node and are destined for a destination node, in a memory (hereinafter called "message buffer"). Then, when communication with other DTN nodes becomes possible, the DTN node determines a forwarding destination and a message(s) to be forwarded thereto in accordance with a routing protocol and forwards the message(s) stored in the message buffer to the determined forwarding destination.

Various proposals for a routing protocol suitable for the DTN have been made. Epidemic routing, Spray and Wait, and PROPHET have been known as typical routing protocols for the DTN. The PROPHET is an abbreviation for "Probabilistic Routing Protocol using History of Encounters and Transitivity". The Epidemic routing and the Spray and Wait do not use any information about a network state. In contrast to this, in the PROPHET, each DTN node stores a history of contacts in the past and uses this history to determine the forwarding destination of a message.

The Epidemic routing is an improved version of the primitive flooding mechanism. Specifically, each DTN node that supports the Epidemic routing manages information called a "summary vector". The summary vector indicates identifiers of messages that have been stored in the message buffer of each DTN node. During a contact with an adjacent DTN node, each DTN node exchanges respective summary vectors with the adjacent DTN node, identifies a message(s) that is not possessed by that DTN node itself, and receives the identified message(s) from the adjacent DTN node.

The Spray and Wait is an improved version of the Epidemic routing. Similarly to the DTN node in the Epidemic routing, during contact with an adjacent DTN node, each DTN node exchanges respective summary vectors with the adjacent DTN node and receives a message(s) that is not possessed by that DTN node itself from the adjacent DTN node. In the Spray and Wait, when a message is generated in the source node, the maximum number of replications of that message allowed to the DTN is specified. In the Spray stage, the DTN node that possesses the message generates copies of the message until the number of replications reaches the specified maximum number, and gives copies of the message to other DTN nodes which the DTN node has encountered. When the number of replications reaches the specified maximum number (Wait stage), the DTN node holds the message without sending copies of that message to other DTN nodes, and only when the DTN node possessing the message has encountered the final destination node, the DTN node sends the message to the final destination node.

In the PROPHET, each DTN node exchanges metrics called "Delivery Predictability" in addition to the summary vectors with an adjacent DTN node. A Delivery Predictability $P(A, B)$ indicates a probability that a DTN node A can deliver a message to a DTN node B. For example, in the case where a node A contacts with a node B, only when the node B has a Delivery Predictability for a destination node D higher than that of the node A (i.e., only when $P(B, D)$ is higher than $P(A, D)$), the node A sends a message addressed to the destination node D to the node B.

Patent Literature 1 discloses an improvement in a message delivery between DTN nodes. Patent Literature 2 discloses an improvement in routing in a DTN.

CITATION LIST

Patent Literature

[Patent Literature 1] International Application Publication No. WO 2011/071045
[Patent Literature 2] International Application Publication No. WO 2013/076912

SUMMARY OF INVENTION

Technical Problem

Similarly to the above-described Epidemic routing, the Spray and Wait, and the PROPHET, most of routing protocols for the DTN generate a number of copies of a message and spread a number of these copies of the message within the DTN. Therefore, even after one of the copies of the message arrives at the final destination node, a number of remaining copies of the message, each of which contains the same content as that of the arrived message, are further spread within the DTN. As a result, a copy of the message, which has already arrived at the final destination node, remains in each DTN node. In order to increase a message delivery success rate in a DTN, it is desirable to delete copies of a message that has already arrived at the destination node and prevent them from being spread within the DTN. Patent Literature 1 and 2 fail to disclose any technique for coping with the above problem.

Accordingly, an object of the present invention is to provide a node device, a communication method, and a program capable of preventing copies of a message that has already arrived at its final destination node from being spread within a DTN.

Solution to Problem

In a first exemplary aspect, a node device used in a Disruption/Delay/Disconnect Tolerant Network (DTN) includes a communication unit and a first message buffer. The communication unit is configured to communicate with an adjacent node in the DTN. The message buffer is configured to store a plurality of messages transferred through the DTN. Further, the communication unit is configured to manage a first summary vector and an Acknowledgement (ACK) list, and also configured to receive a second ACK list managed by the adjacent node during contact with the adjacent node and update the first ACK list and the first summary vector based on the second ACK list. The first summary vector indicates one or more stored messages that have been stored in the first message buffer. During the contact with the adjacent node, the first summary vector is sent to the adjacent node prior to transmission of the one or more stored messages. The first ACK list indicates one or more ACK messages that have been recognized by the node device. The second ACK list indicates one or more ACK messages that have been recognized by the adjacent node. Each of the one or more ACK messages indicates an already-delivered message that has already been delivered to a final destination node through the DTN.

In a second exemplary aspect, a communication method, performed by a node device used in a Disruption/Delay/Disconnect Tolerant Network (DTN), includes: (a) receiving a second ACK list managed by an adjacent node during contact with the adjacent node; and (b) updating a first ACK list and a first summary vector based on the second ACK list, the first ACK list and the first summary vector being managed by the node device. The first summary vector indicates one or more stored messages that have been stored in the first message buffer. During the contact with the adjacent node, the first summary vector is sent to the adjacent node prior to transmission of the one or more stored messages. The first ACK list indicates one or more ACK messages that have been recognized by the node device. The second ACK list indicates one or more ACK messages that have been recognized by the adjacent node. Each of the one or more ACK messages indicates an already-delivered message that has already been delivered to a final destination node through the DTN.

In a third exemplary aspect, a program includes instructions for causing a computer to perform the above-described communication method according to the second exemplary aspect.

Advantageous Effects of Invention

According to aspects stated above, it is possible to provide a node device, a communication method, and a program capable of preventing copies of a message that has already arrived at its final destination node from being spread within a DTN.

DESCRIPTION OF EMBODIMENTS

Specific exemplary embodiments are explained hereinafter in detail with reference to the drawings. The same symbols are assigned to the same or corresponding elements throughout the drawings, and duplicated explanations are omitted as necessary.

First Exemplary Embodiment

Figure 1:
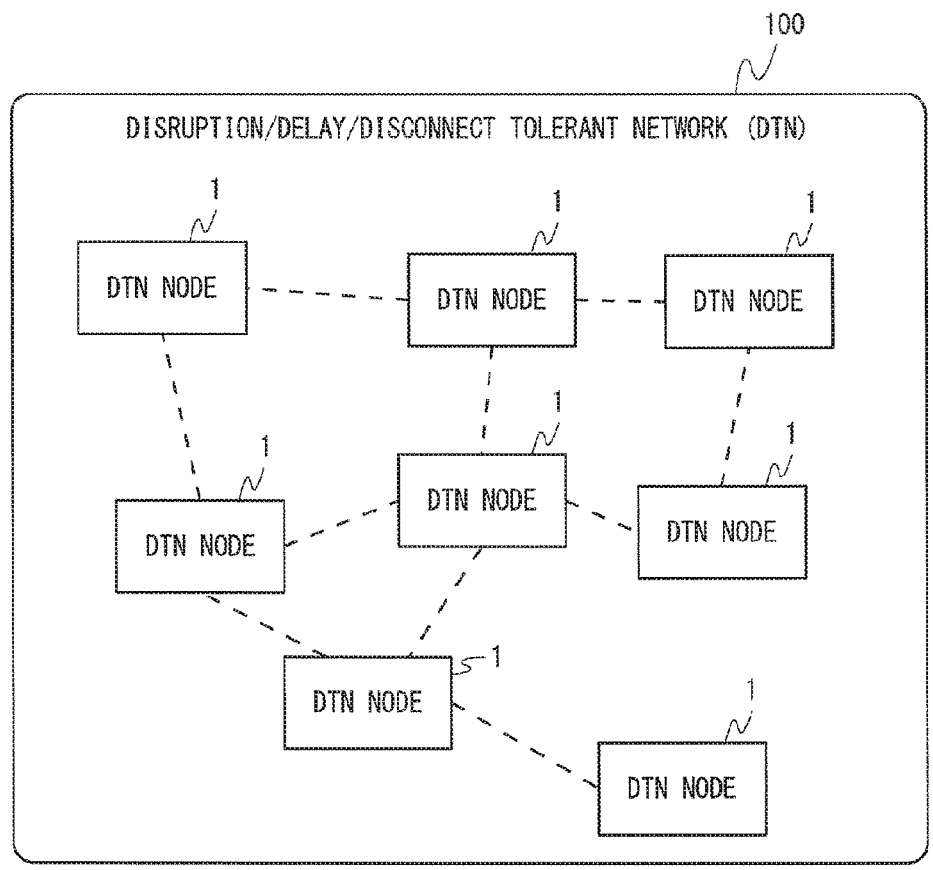
FIG. 1 shows a configuration example of a DTN according to a first exemplary embodiment.

FIG. 1 shows a configuration example of a Disruption/Delay/Disconnect Tolerant Network (DTN) 100 according to this exemplary embodiment. The DTN 100 includes DTN nodes 1. The DTN nodes 1 autonomously relay a message (data bundle or data packet), thereby achieving the delivery of the message from a source node to a destination node.

Each DTN node 1 may be a mobile terminal having mobility (e.g., a cellular phone, a smartphone, a tablet computer, a personal computer (PC)). Each DTN node 1 may be a communication terminal installed in a transport device such as an automobile, an airplane, a railroad vehicle, and a ship. Some of the DTN nodes 1, however, may be fixed wireless terminals such as wireless LAN access points.

Each DTN node 1 performs a store-and-forward operation. That is, each DTN node 1 includes a message buffer for storing messages that are transferred through the DTN 100. Each DTN node 1 temporarily stores, in the message buffer, messages that have been received from other DTN nodes. Then, when communication with other DTN nodes becomes possible, the DTN node 1 determines a forwarding destination and a message(s) to be forwarded thereto in accordance with a routing protocol and sends the message(s) stored in the message buffer to the determined forwarding destination.

The routing protocol used in this exemplary embodiment is any protocol in which a summary vector is used. The routing protocol may be Epidemic routing, Spray and Wait, PROPHET, or a protocol improved thereof. Each DTN node 1 manages a summary vector, which indicates identifiers of messages that have been stored in the message buffer of the DTN node 1. During contact with an adjacent DTN node, the summary vector is sent prior to the transmission of the messages, which have stored in the message buffer. That is, during contact with an adjacent DTN node, each DTN node 1 exchanges summary vectors with an adjacent DTN node, identifies a message(s) that is not possessed by that DTN node itself, and acquires the identified message(s) from the adjacent DTN node.

Figure 2:
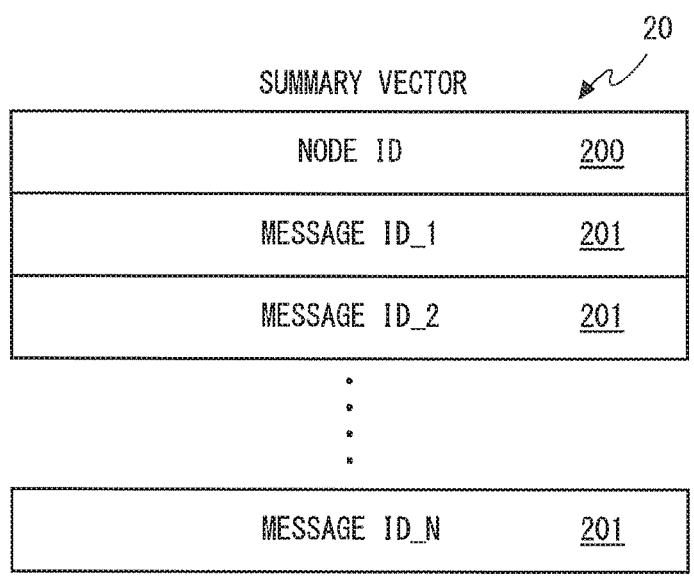
FIG. 2 is a block diagram showing a configuration example of a DTN node according to the first exemplary embodiment.

FIG. 2 shows an example of a structure of a summary vector. A summary vector 20 shown in FIG. 2 includes a node ID 200 and N number of message IDs 201. The node ID 200 indicates an identifier, e.g., an internet protocol (IP) address, of the DTN node 1 that manages the summary vector 20. Each of the N message IDs 201 indicates an identifier of a message that has been stored in the message buffer of the DTN node 1 managing the summary vector 20. For example, each message ID 201 may be specified by the combination of the address of the source node, the address of the destination node, and the sequence number of the message. Alternatively, each message ID 201 may be a hash value calculated from the address of the source node, the address of the destination node, and the sequence number of the message so that its data size is reduced.

Further, in this exemplary embodiment, each DTN node 1 manages an Acknowledgement (ACK) list in addition to the summary vector. The ACK list indicates one or more ACK messages that have been recognized by each DTN node 1. The ACK message indicates an already-delivered message that has already been delivered to the final destination node through the DTN 100.

In principle, the ACK message is generated by the final destination node. When each DTN node 1 receives, through the DTN 100, a message in which the DTN node 1 itself is designated as the final destination, the DTN node 1 may generate an ACK message corresponding to that message and add the generated ACK message to its own ACK list.

The destination of a message transferred in the DTN 100 could, however, be a node that belongs to an external network (e.g., the Internet, a public cellular network, or a wireless Local Area Network (LAN)). Further, a DTN server that relays a message between DTNs that are physically apart from each other could be used. In these cases, at least one of the DTN nodes 1 serves as a router or a gateway that relays a message between the DTN 100 and the external network, or between the DTN 100 and the DTN server. Accordingly, in these cases, when a message to be sent to the other network or the DTN server has arrived at the DTN node 1 that serves as the router or the gateway, that DTN node 1 may generate an ACK message for the arrived message. In other words, the DTN node 1 that serves as the router or the gateway can be regarded as being the final destination node.

Figure 3:
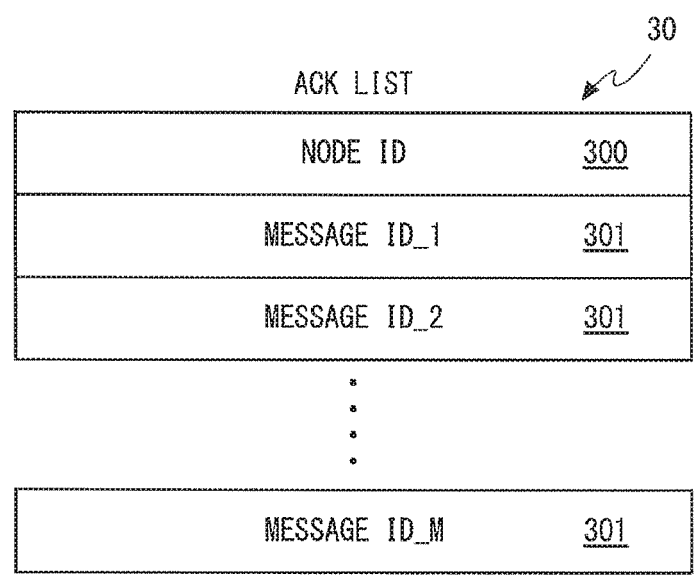
FIG. 3 shows an example of a summary vector.

FIG. 3 shows an example of a structure of an ACK list. An ACK list 30 shown in FIG. 3 includes a node ID 300 and M number of message IDs 301. The node ID 300 indicates an identifier, e.g., an internet protocol (IP) address, of the DTN node 1 that manages the ACK list 30. Each of the M message IDs 301 corresponds to an identifier of an ACK message that has been recognized by the DTN node 1 managing the ACK list 30. Each message ID 301 may be defined in a manner similar to that by which the message IDs 201 included in the summary vector 20 are defined.

Further, the ACK list 30 may include information for specifying the expiration time of each ACK message, e.g., a Time-To-Live (TTL) value or a Times-To-Send (TTS) value. The Time-To-Live (TTL) value specifies the upper limit value for the number of forwarding operations (so-called "hop number") when an ACK message is forwarded among DTN nodes 1. The TTS value specifies the upper limit value for the number of forwarding operations for forwarding an ACK message to another DTN node 1 performed by one DTN node (that is, for the number of replications of an ACK message performed in one DTN node 1). Alternatively, the information for specifying the expiration time of each ACK message may be a combination of information indicating the generation time of the ACK message (i.e., time stamp) and information indicating an available period (i.e., lifespan) expressed in seconds or in minutes. When all the ACK messages have a common available period (lifespan), the ACK list 30 may include only the information indicating the generation time of the ACK message (time stamp) for specifying the expiration time of the ACK message. The information for specifying the expiration time of an ACK message are defined independently of the expiration time of a message stored in the message buffer of the DTN node 1 (e.g., a TTL value, a TTS value, a generation time, or a combination of a generation time and a lifespan, these information elements are held in the summary vector 20).

During contact with an adjacent DTN node, each DTN node 1 exchanges the ACK lists as well as the summary vectors with the adjacent DTN node. Further, each DTN node 1 updates the ACK list held by that DTN node itself based on the ACK list received from the adjacent DTN node. Specifically, each DTN node 1 may merge the ACK list held by itself with the ACK list received from the adjacent DTN node. When expressed in other words in accordance with the set theory, each DTN node 1 may obtain the union of the ACK list held by itself with the ACK list received from the adjacent DTN node.

Further, each DTN node 1 updates the summary vector held by that DTN node itself based on the ACK list received from the adjacent DTN node. Specifically, each DTN node 1 may eliminate, from its own summary vector, an entry corresponding to a message(s) having the same identifier as that of an already-delivered message(s) listed in the ACK list received from the adjacent DTN node. As a result, each DTN node 1 does not forward the message which has already arrived at the final destination node to an adjacent node any longer. This is because, since the entry corresponding to the message which has already arrived at the final destination node is eliminated from the summary vector, the message which has already arrived at the final destination node is not presented to an adjacent DTN node any longer. Therefore, it is possible to prevent copies of the message which has already arrived at the final destination node from being spread within the DTN 100.

Further, each DTN node 1 may update its own message buffer based on the ACK list received from the adjacent DTN node. Specifically, each DTN node 1 may delete, from its own message buffer, a message having the same identifier as that of an already-delivered message listed in the ACK list received from the adjacent DTN node. Note that the deletion of a message may be performed by overwriting (updating) the message data stored in the message buffer of the DTN node 1 with null data having a data size of zero. In this way, each DTN node 1 can increase the use efficiency of the message buffer, thus contributing to an improvement in the message delivery success rate of the DTN 100. This is because, by deleting the unnecessary message, which does not need to be forwarded any longer, from the message buffer, that area of the message buffer can be used for other messages that should be forwarded.

Figure 4:
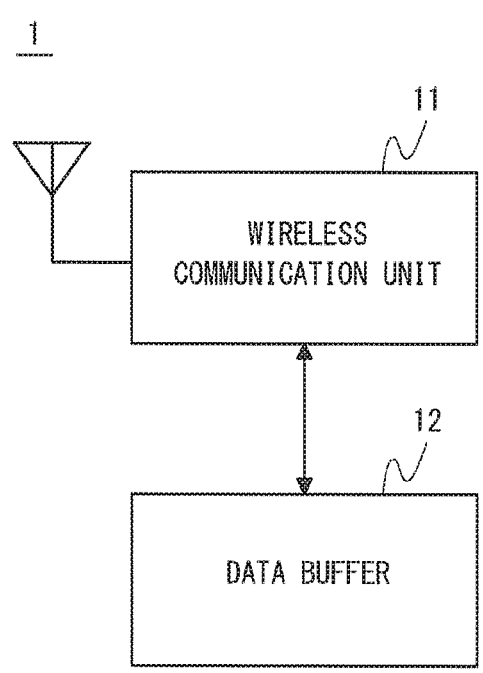
FIG. 4 shows an example of an ACK list.

Next, a configuration example of the DTN node 1 and its operation are explained hereinafter in a more detailed manner. FIG. 4 shows a configuration example of the DTN node 1. A wireless communication unit 11 wirelessly communicates with other DTN nodes 1 in the DTN 100. That is, the wireless communication unit 11 includes a transceiver having the physical layers of the wireless communication technology used in the DTN 100, and supports the protocol suite of the data link layer, the network layer, and the transport layer of the wireless communication technology used in the DTN 100. Further, the wireless communication unit 11 also supports a bundle layer protocol. The bundle layer protocol is positioned between the application layer and the transport layer, and provides store-and-forward communication necessary for the DTN. The Protocol Data Unit (PDU) of the bundle layer may be referred to as a message bundle or a data bundle.

The radio communication unit 11 manages the above-described summary vector and the ACK list according to the bundle layer protocol. Further, during contact with an adjacent DTN node, the radio communication unit 11 exchanges the summary vectors and the ACK lists with the adjacent DTN node, and sends and/or receives messages according to the bundle layer protocol.

A data buffer 12 is configured to store a plurality of messages transferred through the DTN 100. The data buffer 12 may be a volatile memory such as a Dynamic Random Access Memory (DRAM) and a Static Random Access Memory (SRAM), a nonvolatile memory such as a hard disk drive and a flash memory, or a combination thereof.

Figure 5:
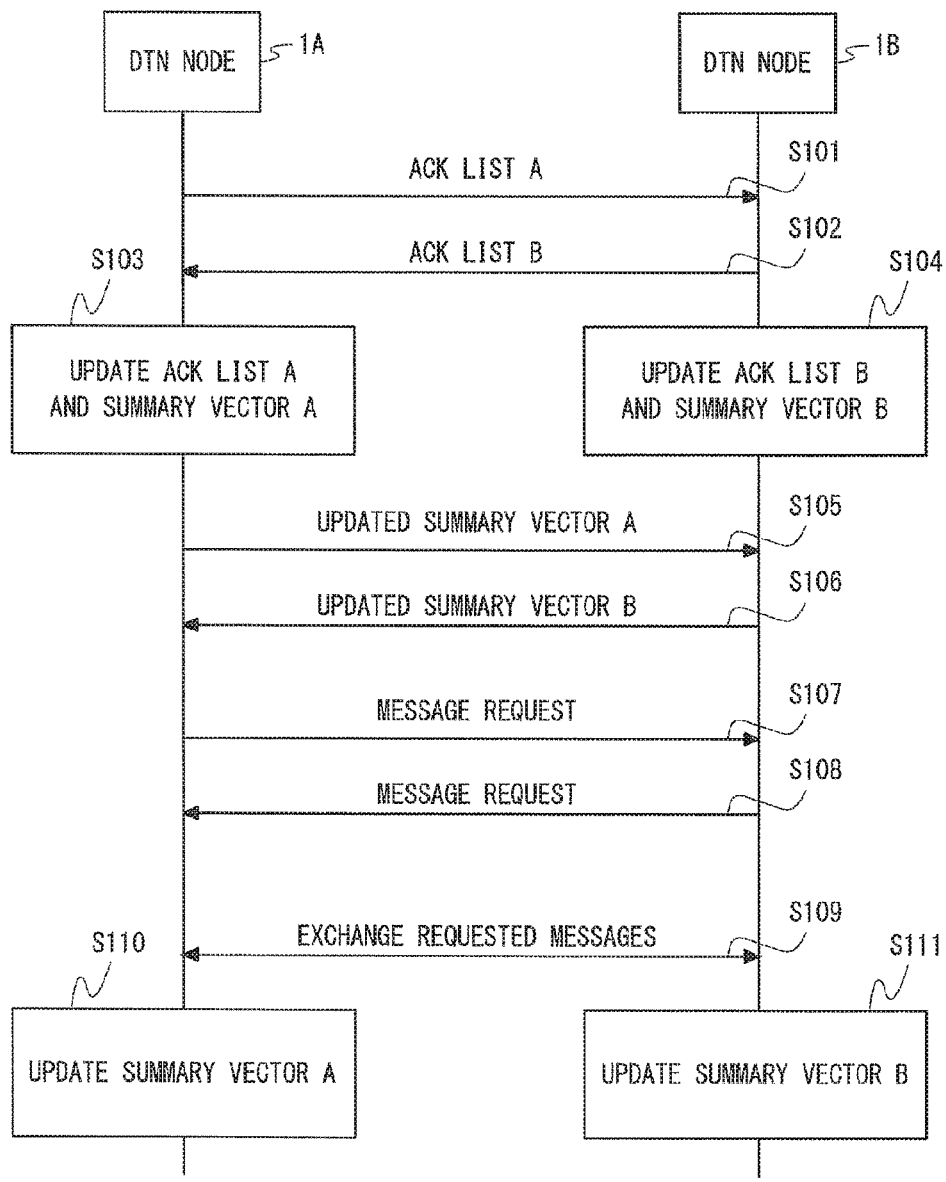
FIG. 5 is a sequence diagram showing an example of a communication procedure of a DTN node according to the first exemplary embodiment.

A sequence diagram shown in FIG. 5 shows an example of a communication procedure of the DTN node 1 according to this exemplary embodiment. The example shown in FIG. 5 shows a case where two DTN nodes 1 (1A and 1B) move closer to each other and hence start contact therebetween. In steps S101 and S102, the DTN nodes 1A and 1B exchange their ACK lists. That is, the DTN node 1A sends its ACK list A to the DTN node 1B (step S101). The DTN node 1B sends its ACK list B to the DTN node 1A (step S102). In a step S103, the DTN node 1A updates its ACK list A and summary vector A based on the ACK list B received from the DTN node 1B. In a step S104, the DTN node 1B updates its ACK list B and summary vector B based on the ACK list A. The updating procedure of the ACK list and the summary vector is performed as described above. Each of the DTN nodes 1A and 1B may further update its message buffer.

In steps S105 and S106, the DTN nodes 1A and 1B exchange their summary vectors, which have been updated based on the ACK lists of the counterpart DTN nodes. That is, the DTN node 1A sends its summary vector A, which has been updated based on the ACK list B of the counterpart DTN node, to the DTN node 1B (step S105). The DTN node 1B sends its summary vector B, which has been updated based on the ACK list A of the counterpart DTN node, to the DTN node 1A (step S106).

In a step S107, the DTN node 1A compares its summary vector A with the summary vector B of the counterpart DTN node, and requests the DTN node 1B to send a message(s) that is not included in the summary vector A. In a step S108, the DTN node 1B compares its summary vector B with the summary vector A of the counterpart DTN node, and requests the DTN node 1A to send a message(s) that is not included in the summary vector B. In a step S109, each of the DTN nodes 1A and 1B sends the messages requested by the counterpart DTN node to it. Each of the DTN nodes 1A and 1B stores the message received from the counterpart DTN node into its own message buffer.

In steps S110 and S111, the DTN nodes 1A and 1B update their respective summary vectors A and B based on the result of the step S109.

According to the procedure shown in FIG. 5, the summary vectors, which have been updated based on the ACK lists of the adjacent DTN nodes, are exchanged in the steps S105 and S106. Therefore, it provides an advantage that the sizes of the summary vector can be reduced and information about messages that is unnecessary for the adjacent DTN node is not presented to the adjacent DTN node. This is because information about messages corresponding to respective ACK messages recognized by the adjacent DTN node has already been eliminated from the summary vector to be exchanged.

Other examples of the communication procedure of the DTN node 1 are explained hereinafter in the below-described second and third exemplary embodiments.

Second Exemplary Embodiment

In this exemplary embodiment, a specific example of the communication procedure of the DTN node 1 is explained. The configuration example of the DTN 100 in this exemplary embodiment is similar to that shown in FIG. 1, and the configuration example of the DTN node 1 is similar to that shown in FIG. 4.

Figure 6:
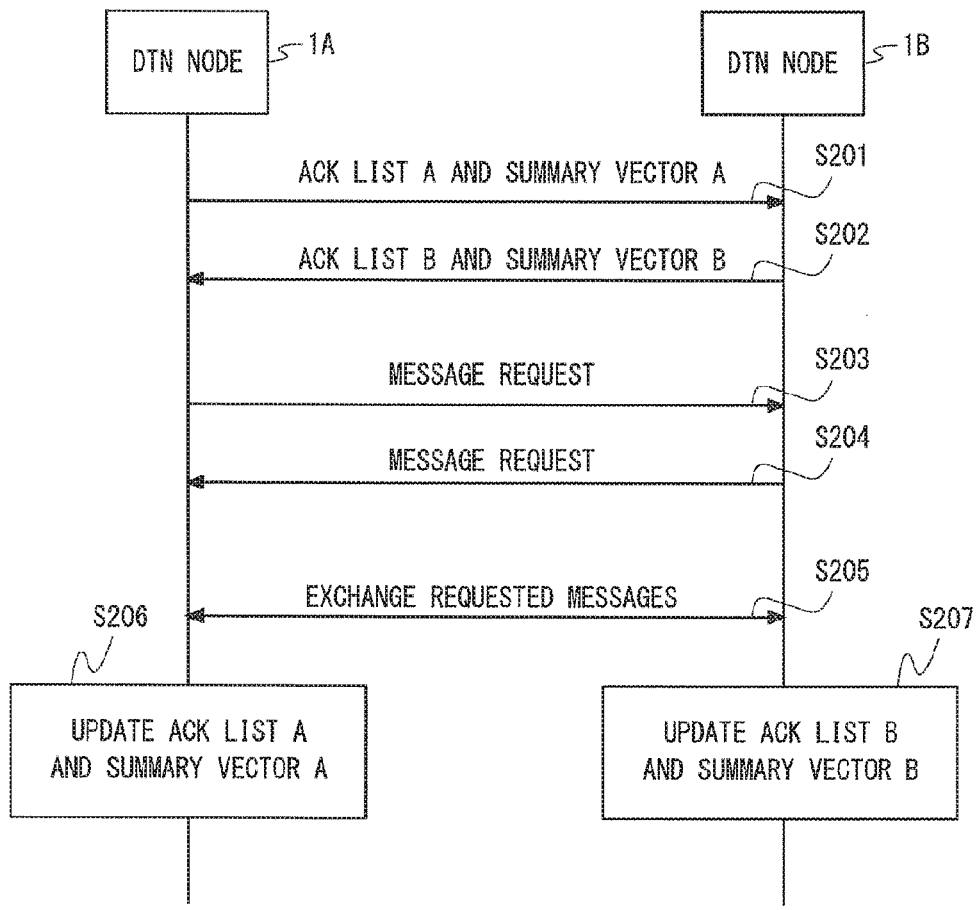
FIG. 6 is a sequence diagram showing an example of a communication procedure of a DTN node according to a second exemplary embodiment.

A sequence diagram shown in FIG. 6 shows an example of a communication procedure of the DTN node 1 according to this exemplary embodiment. When the procedure shown in FIG. 6 is compared with that shown in FIG. 5, it is seen that the procedure shown in FIG. 6 is different from that shown in FIG. 5 in that the summary vector that has not yet been updated based on the ACK lists of the adjacent DTN node is sent to the adjacent DTN node, and then messages are exchanged in the procedure shown in FIG. 6.

In steps S201 and S202, the DTN nodes 1A and 1B exchange their ACK lists and summary vectors. That is, the DTN node 1A sends its ACK list A and summary vector A to the DTN node 1B (step S201). The DTN node 1B sends its ACK list B and summary vector B to the DTN node 1A (step S202).

In a step S203, the DTN node 1A requests the DTN node 1B to send a message(s) that is listed in the summary vector B of the DTN node 1B but is listed in neither its own summary vector A nor its own ACK list A. Similarly, in a step S204, the DTN node 1B requests the DTN node 1A to send a message(s) that is listed in the summary vector A of the DTN node 1A but is listed in neither its own summary vector B nor its own ACK list B.

In a step S205, each of the DTN nodes 1A and 1B sends the messages requested by the counterpart DTN node to it. Each of the DTN nodes 1A and 1B stores the message received from the counterpart DTN node into its own message buffer.

In a step S206, the DTN node 1A updates the ACK list A according to the ACK list B received in the step S201. The DTN node 1A may obtain the union of the ACK lists A and B. Further, the DTN node 1A updates the summary vector A according to the ACK list B received in the step S201 and on the result of the message exchange performed in the step S205. The DTN node 1A may delete the identifier of a message listed in the ACK list B from the summary vector A and add the identifier of a message received in the step S205 to the summary vector A.

In a step S207, similarly to the step S206, the DTN node 1B updates the ACK list B according to the ACK list A received in the step S202. Further, the DTN node 1B updates the summary vector B according to the ACK list A received in the step S202 and the result of the message exchange performed in the step S205.

Note that in the steps S206 and S207, each of the DTN nodes 1A and 1B may further update its message buffer.

The time during which adjacent DTN nodes 1 can communicate with each other may be limited. Therefore, it is desirable that the time required for completing a message exchange be reducible. This is because, by doing so, failed message exchanges can be reduced. According to the procedure shown in FIG. 6, the messages can be exchanged without waiting for the completion of the summary vector updating process performed based on the ACK list received from the adjacent DTN node (steps S203 to S205). Therefore, it is expected that the procedure shown in FIG. 6 will be able to reduce the time necessary for completing a message exchange compared to the time necessary in the procedure shown in FIG. 5.

Third Exemplary Embodiment

The communication procedures of the DTN node 1 explained above in the first and second exemplary embodiments are merely examples, and can be modified in a various fashions. For example, the exchange of the ACK lists between adjacent DTN nodes 1 may be performed through a separate procedure from the exchange of the summary vectors and the transmission/reception of the messages. Further, the communication procedure regarding the ACK list may include only one-way transmission, rather than performing the exchange of the ACK lists (i.e., rather than performing two-way transmission).

Figure 7:
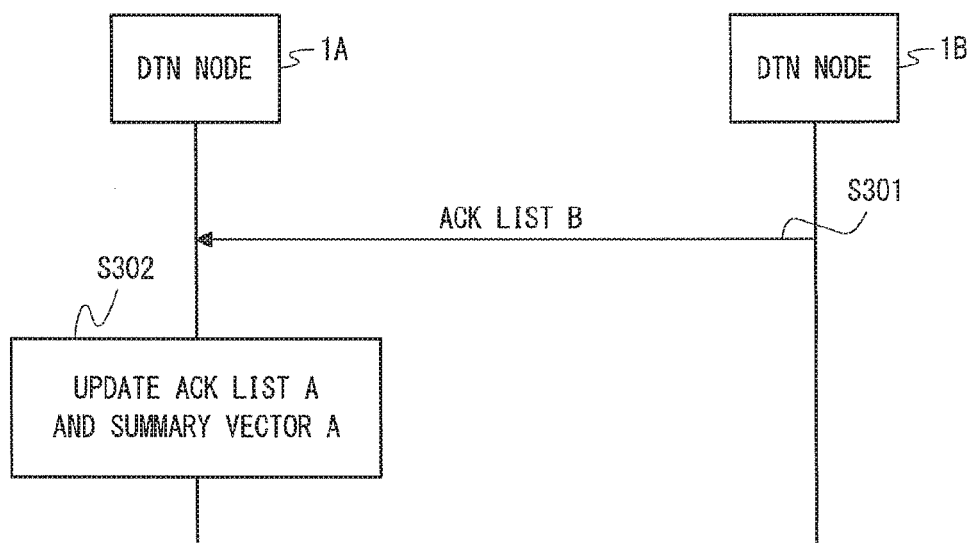
FIG. 7 is a sequence diagram showing an example of a communication procedure of a DTN node according to a third exemplary embodiment.

FIG. 7 shows a simple sequence showing one-way reception of the ACK list B from the DTN node 1B and updating of the own summary vector A and ACK list A based on this one-way reception. In a step S301, the DTN node 1A receives the ACK list B from the DTN node 1B. In a step S302, the DTN node 1A updates its own ACK list A and summary vector A based on the ACK list B received from the DTN node 1B.

Specifically, the DTN node 1A may eliminate, from its own summary vector A, a message having the same identifier as that of an already-delivered message listed in the ACK list B of the adjacent DTN node 1B. As a result, the DTN node 1A does not forward the message which has already arrived at the final destination node to adjacent nodes any longer. This is because, since the message which has already arrived at the final destination node is eliminated from the summary vector A, the DTN node 1A does not present the message, which has already arrived at the final destination node, to adjacent DTN nodes any longer. Therefore, it is possible to prevent copies of the message which has already arrived at the final destination node from being spread within the DTN 100.

Fourth Exemplary Embodiment

In this exemplary embodiment, a modified example of the data structure of the summary vector and the ACK list is explained. Specifically, an example in which the ACK list is combined with the summary vector is shown in this exemplary embodiment. That is, in this exemplary embodiment, the ACK list is piggybacked on the summary vector. In other words, in this exemplary embodiment, the summary vector and the ACK list are managed as a common list in a DTN node. Specifically, in this exemplary embodiment, each entry in the summary vector includes information for indicating whether that entry is for a message stored in the message buffer or for an ACK message. This information may be, for example, an ACK flag indicating whether it is an ACK message or not. Alternatively, this information may indicate whether the entry in the summary vector is associated with valid data or not. In this case, when an entry in the summary vector is associated with invalid data (e.g., null data having a data size of zero), that entry may be regarded as an entry for an ACK message.

Figure 8:
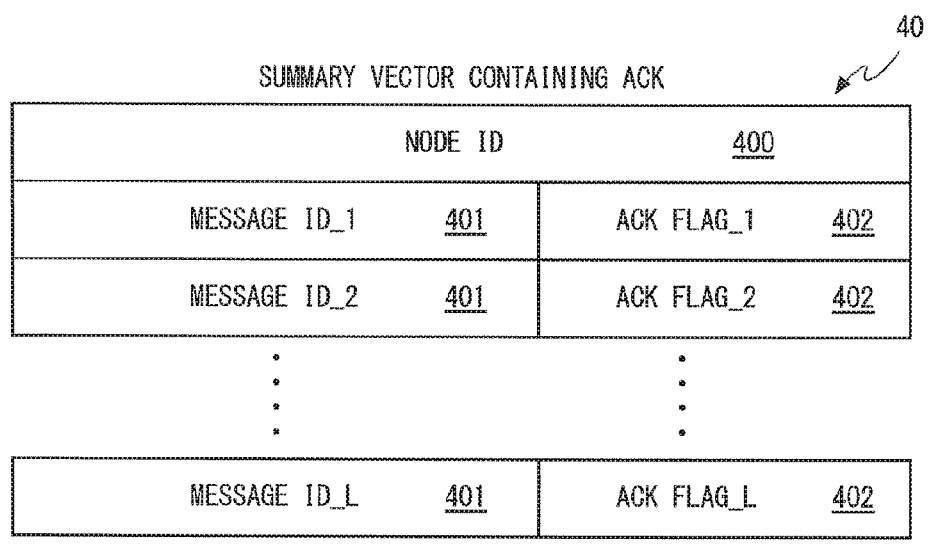
FIG. 8 shows an example of a summary vector including an ACK according to a fourth exemplary embodiment.

FIG. 8 shows an example of a summary vector containing an ACK according to this exemplary embodiment. A summary vector 40 shown in FIG. 8 includes a node ID field 200, L number of message ID fields 401, and L number of ACK flag fields 402. The L ACK flag fields 402 correspond to the L message ID fields 401. Each ACK flag field 402 indicates whether the value of the corresponding message ID field 401 is for a message stored in the message buffer or for an ACK message. For example, when the value of an ACK flag field 402 is "0", the value of its corresponding message ID field 401 is considered to be the ID of a message stored in the message buffer. On the other hand, when the value of an ACK flag field 402 is "1", the value of its corresponding message ID field 401 is considered to be the ID of an ACK message, i.e., the ID of a message which has already arrived at the final destination node.

Figure 9:
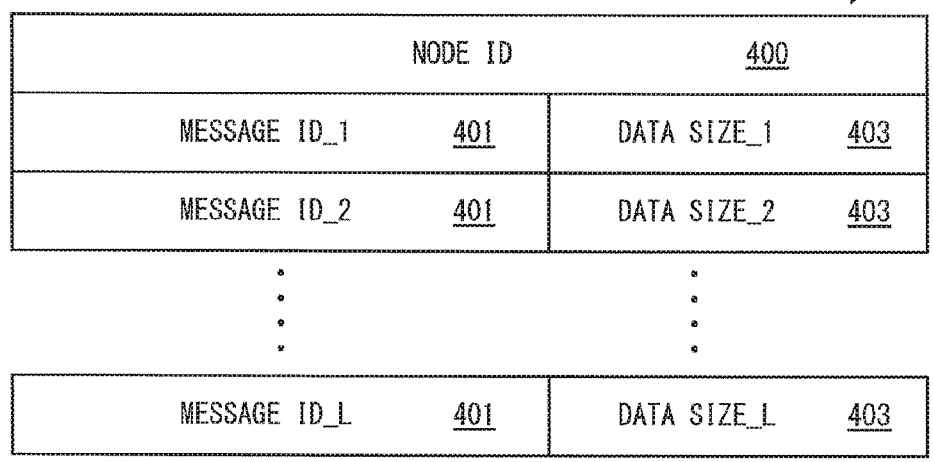
FIG. 9 shows an example of a summary vector including an ACK according to the fourth exemplary embodiment.

FIG. 9 shows another example of a summary vector containing an ACK according to this exemplary embodiment. A summary vector 41 shown in FIG. 9 includes a node ID field 200, L number of message ID fields 401, and L number of data size fields 403. The L data size fields 403 correspond to the L message ID fields 401. Each data size field 403 indicates whether the value of the corresponding message ID field 401 is for a message stored in the message buffer or for an ACK message. Specifically, when a data size field 403 has a valid value (a valid data size larger than zero), it indicates that the entry is for a message stored in the message buffer. On the other hand, when a data size field 403 has a value "zero" or an invalid value, it indicates that the entry is for an ACK message.

By combining the ACK list with the summary vector, that is, by using an ACK message(s) added in (piggybacked on) the summary vector, the process for exchanging ACK lists becomes unnecessary in the communication procedure between adjacent DTN nodes. Therefore, only the exchange of summary vectors need to be performed. In other words, the DTN node 1 can spread ACK messages (i.e., notice indicating messages that have arrived at their final destination) by using the mechanism for spreading messages in accordance with the Epidemic routing or the like, which uses a summary vector. Therefore, the DTN node 1 does not require any additional mechanism for spreading ACK messages (i.e., a procedure for exchanging ACK lists). Accordingly, the communication procedure between adjacent DTN nodes 1 can be simplified.

Specifically, the DTN node 1 may operate as described below. When a summary vector received from an adjacent DTN node includes an entry having the same message ID as that of an entry included in its own summary vector, and while the data size indicated in the its own summary vector has a valid value, the data size indicated in the summary vector of the adjacent DTN node has zero or an invalid value, the DTN node 1 deletes the message data stored in the data buffer 12. Further, the DTN node 1 overwrites (updates) the data size field 403 of that data in its own summary vector with zero or an invalid value. By the above-described message updating operation, it is possible to spread an ACK message and delete an already-delivered message from the data buffer 12.

Further, the use of the mechanism for updating a message (updating a message with null data) also provides an advantage that the DTN node 1 can update or reset the expiration time (e.g., a lifespan based on a time stamp, a Time-To-Live (TTL) value, or a Times-To-Send (TTS) value) of the message. Therefore, it is possible to prevent a situation in which an entry in the summary vector indicating that the data size is zero or an invalid value (i.e., an entry corresponding to an ACK message) is deleted before the entry is sufficiently spread within the DTN 100 due to the expiration of the expiration time. As a result, it is possible to facilitate a situation in which an ACK message is sufficiently spread within the DTN 100 and an already-delivered message which has already been delivered to its final destination node is deleted from the DTN 100.

As shown in FIG. 9, the use of the data size information in the summary vector for indicating whether the entry is for an ACK or not is particularly effective when the data size information is included in the summary vector. The data size information included in the summary vector can be used as a part of the identifier of the message or for indicating whether the message is updated or not. Further, in the example shown in FIG. 9, since the data size information is used to indicate whether the entry is for an ACK or not, it has an advantage that there is no need to introduce a new summary vector structure such as a structure including an ACK flag field shown in FIG. 8.

Other Exemplary Embodiments

The communication procedure performed by the DTN node 1 explained in the above-described plurality of exemplary embodiments may be implemented by causing a computer system to execute a program. Specifically, one or more programs including instructions for causing a computer system to perform the algorism explained in the specification of the present application with reference to the sequence diagrams or the like may be created, and the created program may be supplied to the computer system.

This program can be stored in various types of non-transitory computer readable media and thereby supplied to computers. The non-transitory computer readable media includes various types of tangible storage media. Examples of the non-transitory computer readable media include a magnetic recording medium (e.g. a flexible disk, a magnetic tape, and a hard disk drive), a magneto-optic recording medium (e.g. a magneto-optic disk), a Compact Disc Read Only Memory (CD-ROM), a CD-R, and a CD-R/W, and a semiconductor memory (e.g. a mask ROM, a Programmable ROM (PROM), an Erasable PROM (EPROM), a flash ROM, and a Random Access Memory (RAM)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Further, the above-described exemplary embodiments are mere examples for the application of the technical idea achieved by the inventors of the present application. That is, needless to say, that technical idea is not limited to the above-described exemplary embodiments and various modifications can be made thereto.

This application is based upon and claims the benefit of priority from Japanese Patent Application No. 2014-041474, filed on Mar. 4, 2014, and the disclosure of which is incorporated herein in its entirety by reference.

REFERENCE SIGNS LIST

1 DISRUPTION/DELAY/DISCONNECT TOLERANT NETWORK (DTN) NODE
11 WIRELESS COMMUNICATION UNIT
12 DATA BUFFER
20 SUMMARY VECTOR
30 ACK LIST
40 SUMMARY VECTOR CONTAINING ACK
100 DISRUPTION/DELAY/DISCONNECT TOLERANT NETWORK (DTN)

The invention claimed is:

1. A node device used in a Disruption/Delay/Disconnect Tolerant Network (DTN), the node device comprising:
a communication unit configured to communicate with an adjacent node in the DTN; and
a first message buffer configured to store a plurality of messages transferred through the DTN, wherein
the communication unit is configured to manage a first summary vector and an ACK list, and also configured to receive a second ACK list managed by the adjacent node during contact with the adjacent node and update the first ACK list and the first summary vector based on the second ACK list,
the first summary vector indicates one or more stored messages that have been stored in the first message buffer, and the first summary vector is sent to the adjacent node, during the contact with the adjacent node, prior to transmission of the one or more stored messages,
the first ACK list indicates one or more ACK messages that have been recognized by the node device,
the second ACK list indicates one or more ACK messages that have been recognized by the adjacent node, and
each of the one or more ACK messages indicates an already-delivered message that has already been delivered to a final destination node through the DTN, wherein,
the first summary vector and the first ACK list are managed as a first common list in the node device,
each entry in the first common list includes data size information indicating a data size of a message,
when the data size information indicates a valid value, the entry corresponding thereto is for a message stored in the first message buffer, and
when the data size information indicates zero or an invalid value, the entry corresponding thereto is for an ACK message.

2. The node device according to claim 1, wherein
the communication unit receives the second ACK list with a second summary vector managed by the adjacent node during the contact with the adjacent node,
the second summary vector indicates one or more stored messages that have been stored in a second message buffer arranged in the adjacent node, and
the communication unit updates the first ACK list and the first summary vector after receiving the second summary vector.

3. The node device according to claim 2, wherein the communication unit requests the adjacent node to send a message that is listed in the second summary vector and is listed in neither the first ACK list nor the first summary vector.

4. The node device according to claim 1, wherein after receiving the second ACK list and updating the first summary vector, the communication unit sends the updated first summary vector to the adjacent node during the contact with the adjacent node.

5. The node device according to claim 1, wherein the first ACK list is piggybacked on the first summary vector.

6. The node device according to claim 1, wherein the information includes an ACK flag.

7. The node device according to claim 1, wherein
the second summary vector and the second ACK list managed by the adjacent node are defined as a second common list,
each entry in the second common list includes data size information indicating a data size of a message,
when the data size information in the second common list indicates a valid value, the entry corresponding thereto is for a message stored in a second message buffer arranged in the adjacent node,
when the data size information in the second common list indicates zero or an invalid value, the entry corresponding thereto is for an ACK message, and
the communication unit deletes, from the first message buffer, a message whose data size is indicated as zero or an invalid value in the second common list received from the adjacent node.

8. The node device according to claim 1, wherein in response to receiving, through the DTN, a first message in which the node device is designated as a final destination, the communication unit adds an ACK message corresponding to the first message in the first ACK list.

9. The node device according to claim 1, wherein the communication unit sends the first ACK list to the adjacent node during the contact with the adjacent node.

10. The node device according to claim 1, wherein the updating of the first ACK list is performed by merging the first ACK list with the second ACK list received from the adjacent node.

11. The node device according to claim 1, wherein the updating of the first summary vector is performed by eliminating, from the first summary vector, an entry regarding a message having the same identifier as that of the already-delivered message listed in the second ACK list.

12. The node device according to claim 1, wherein the communication unit updates the first message buffer based on the second ACK list.

13. The node device according to claim 12, wherein the updating of the first message buffer is performed by deleting, from the first message buffer, a message having the same identifier as that of the already-delivered message listed in the second ACK list.

14. The node device according to claim 1, wherein each of the one or more ACK messages is generated by the destination node.

15. A communication method performed by a node device used in a Disruption/Delay/Disconnect Tolerant Network (DTN), the method comprising:
receiving a second ACK list managed by an adjacent node during contact with the adjacent node; and
updating a first ACK list and a first summary vector based on the second ACK list, the first ACK list and the first summary vector being managed by the node device,
wherein
the first summary vector indicates one or more stored messages that have been stored in the first message buffer arranged in the node device, and the first summary vector is sent to the adjacent node, during the contact with the adjacent node, prior to transmission of the one or more stored messages,
the first ACK list indicates one or more ACK messages that have been recognized by the node device,
the second ACK list indicates one or more ACK messages that have been recognized by the adjacent node, and
each of the one or more ACK messages indicates an already-delivered message that has already been delivered to a final destination node through the DTN, wherein,
the first summary vector and the first ACK list are managed as a first common list in the node device,
each entry in the first common list includes data size information indicating a data size of a message,
when the data size information indicates a valid value, the entry corresponding thereto is for a message stored in the first message buffer, and
when the data size information indicates zero or an invalid value, the entry corresponding thereto is for an ACK message.

16. The communication method according to claim 15, wherein
the receiving the second ACK list comprises receiving the second ACK list with a second summary vector managed by the adjacent node during the contact with the adjacent node,
the second summary vector indicates one or more stored messages that have been stored in a second message buffer arranged in the adjacent node, and
the updating the first ACK list and the first summary vector are performed after the second summary vector is received.

17. The communication method according to claim 16, further comprising requesting the adjacent node to send a message that is listed in the second summary vector and is listed in neither the first ACK list nor the first summary vector.

18. The communication method according to claim 15, further comprising, after the receiving the second ACK list and the updating the first summary vector, sending the updated first summary vector to the adjacent node during the contact with the adjacent node.

19. The communication method according to claim 15, wherein the first ACK list is piggybacked on the first summary vector.

20. The communication method according to claim 15, wherein the information includes an ACK flag.

21. The communication method according to claim 15, wherein
the second summary vector and the second ACK list managed by the adjacent node are defined as a second common list,
each entry in the second common list includes data size information indicating a data size of a message,
when the data size information in the second common list indicates a valid value, the entry corresponding thereto is for a message stored in a second message buffer arranged in the adjacent node,
when the data size information in the second common list indicates zero or an invalid value, the entry corresponding thereto is for an ACK message, and
the communication method further comprising deleting, from the first message buffer, a message whose data size is indicated as zero or an invalid value in the second common list received from the adjacent node.

22. The communication method according to claim 15, further comprising, in response to receiving, through the DTN, a first message in which the node device is designated as a final destination, adding an ACK message corresponding to the first message in the first ACK list.

23. The communication method according to claim 15, further comprising sending the first ACK list to the adjacent node during the contact with the adjacent node.

24. The communication method according to claim 15, wherein the updating of the first ACK list is performed by merging the first ACK list with the second ACK list received from the adjacent node.

25. The communication method according to claim 15, wherein the updating of the first summary vector is performed by eliminating, from the first summary vector, an entry regarding a message having the same identifier as that of the already-delivered message listed in the second ACK list.

26. The communication method according to claim 15, further comprising updating the first message buffer based on the second ACK list.

27. The communication method according to claim 26, wherein the updating of the first message buffer is performed by deleting, from the first message buffer, a message having the same identifier as that of the already-delivered message listed in the second ACK list.

28. The communication method according to claim 15, wherein each of the one or more ACK messages is generated by the destination node.

29. A non-transitory computer readable medium storing a program for causing a computer to perform a communication method, wherein
the communication method comprises:
receiving a second ACK list managed by an adjacent node during contact with the adjacent node; and
updating a first ACK list and a first summary vector based on the second ACK list, the first ACK list and the first summary vector being managed by the node device, wherein
the first summary vector indicates one or more stored messages that have been stored in the first message buffer arranged in the node device, and the first summary vector is sent to the adjacent node, during the contact with the adjacent node, prior to transmission of the one or more stored messages,
the first ACK list indicates one or more ACK messages that have been recognized by the node device,
the second ACK list indicates one or more ACK messages that have been recognized by the adjacent node, and
each of the one or more ACK messages indicates an already-delivered message that has already been delivered to a final destination node through the DTN, wherein,
the first summary vector and the first ACK list are managed as a first common list in the node device,
each entry in the first common list includes data size information indicating a data size of a message,
when the data size information indicates a valid value, the entry corresponding thereto is for a message stored in the first message buffer, and
when the data size information indicates zero or an invalid value, the entry corresponding thereto is for an ACK message.

30. A node device used in a Disruption/Delay/Disconnect Tolerant Network (DTN), the node device comprising:
a communication unit configured to communicate with an adjacent node in the DTN; and
a first message buffer configured to store a plurality of messages transferred through the DTN, wherein
the communication unit is configured to manage a first summary vector, and also configured to receive a second summary vector managed by the adjacent node during contact with the adjacent node and update the first summary vector and the first message buffer based on the second summary vector,
the first summary vector indicates one or more stored messages that have been stored in the first message buffer,
the second summary vector indicates one or more stored messages that have been stored in a second message buffer arranged in the adjacent node,
each entry in the first and second summary vectors includes data size information indicating a data size of a message,
when the data size information indicates a valid value, the entry corresponding thereto is for a message that has been stored in the first message buffer or the second message buffer,
when the data size information indicates zero or an invalid value, the entry corresponding thereto is for an already-delivered message that has already been delivered to a final destination node through the DTN, and
the communication unit deletes, from the first message buffer, message data corresponding to the already-delivered message whose data size is indicated as zero or an invalid value in the second summary vector, and updates the first summary vector to overwrite the data size information in the entry, corresponding to the already-delivered message, with zero or an invalid value.

31. The node device according to claim 30, wherein in response to overwriting the data size information in an entry of the first summary vector with zero or an invalid value, the communication unit updates or resets an expiration time of that entry.

* * * * *